United States Patent [19]

Phelps

[11] Patent Number: 4,972,540
[45] Date of Patent: Nov. 27, 1990

[54] SWIMMING POOL ESCAPE SYSTEM FOR ANIMALS AND INSECTS

[76] Inventor: James L. Phelps, 13194 Sky Way, Ellicott City, Md. 21043

[21] Appl. No.: 466,616

[22] Filed: Jan. 17, 1990

[51] Int. Cl.⁵ .............................................. E01D 19/02
[52] U.S. Cl. .......................................... 14/75; 160/12; 14/71.3; 119/82; 43/107
[58] Field of Search ...................... 4/DIG. 1, 490, 495, 4/496, 488; 160/12, 13, 14, 15, 16, 17; 52/261, 262, 283; D25/2; 14/75, 71.1, 71.3, 69.5; 119/82; D21/224, 228; 210/776, 164, 169; 43/107, 133, 134

[56] References Cited

U.S. PATENT DOCUMENTS

| | | | |
|---|---|---|---|
| 3,540,063 | 2/1969 | Stanwood | 4/497 |
| 3,637,080 | 1/1972 | Markel | 210/776 |
| 3,716,142 | 2/1973 | Bianchi | 210/776 |
| 3,755,829 | 9/1973 | Walklet | 405/35 |
| 4,052,755 | 10/1977 | Baker | 4/497 |
| 4,053,412 | 10/1977 | Stix | 210/169 |
| 4,834,880 | 5/1989 | Lundin | 210/776 |
| 4,838,735 | 6/1989 | Warner | 405/220 |

FOREIGN PATENT DOCUMENTS

2034649 6/1980 United Kingdom ................. 14/71.1

*Primary Examiner*—Ramon S. Britts
*Assistant Examiner*—Roger J. Schoeppel
*Attorney, Agent, or Firm*—Morton J. Rosenberg; David I. Klein

[57] ABSTRACT

A swimming pool escape system is provided for use by animals and insects to egress a swimming pool subsequent to inadvertent entry into the body of water contained within the perimeter portion of the pool. The system includes a base member disposed on the perimeter portion of the swimming pool and a ramp system pivotedly coupled to the base member. The ramp system is pivotedly coupled to the base member on one end and an opposing end extends into the volume of water contained within the swimming pool and is buoyantly supported thereby to allow the animal to egress from the body of water to the perimeter portion of the swimming pool.

15 Claims, 1 Drawing Sheet

SWIMMING POOL ESCAPE SYSTEM FOR ANIMALS AND INSECTS

FIELD OF THE INVENTION

This invention directs itself to systems for use by animals and insects to egress from a contained body of water into which they have inadvertently entered. In particular, this invention directs itself to a floating ramp type system wherein one end of the ramp is buoyantly supported by the body of water into which it extends. More in particular, this invention pertains to ramp type systems buoyantly supported on one end and having a cantilevered pivotal coupling on the opposing end. Further, this invention directs itself to a buoyantly supported ramp type system incorporating a wave suppression system therein. Still further, this invention directs itself to buoyantly supported ramp type systems incorporating wave suppression systems formed by interconnected longitudinal slots and transverse angularly directed through opening passages.

PRIOR ART

Ramp systems are well known in the art, as are wave suppression systems. The best prior art known to the Applicant include U.S. Pat. Nos. #4,581,784; #4,838,735; #3,540,063; #146,426; #3,755,829; #4,789,470; #4,734,189; #4,052,755; and, #4,107,932.

Some prior art systems such as that shown in U.S. Pat. No. #4,581,784 are directed to ramp type systems for providing access from a pier to a floating dock. In these systems, the ramp is pivotedly coupled to the pier to allow its angle of inclination to be adjusted responsive to the height of the water level. However, these ramps are provided by wheels or rollers to allow displacement of the distal end of the ramp along the upper surface of the floating dock. Thus the ramp is displaced by the floating dock and does not float directly in the water.

In other systems such as that shown in U.S. Pat. No. #4,838,735, there is provided a parallelogram linkage structure by which a floating pier structure is coupled to the shoreline. The parallelogram linkage defines a means for accessing the platform, however the means for flotation is mounted at the platform and is pivotedly coupled to the ramp, as opposed to being incorporated into the ramp itself.

In prior art systems such as that disclosed in U.S. Pat. No. #146,426 there is shown a life raft type device. The raft is formed of flexibly coupled wood bars, and intended to be fixedly coupled on one end to a seagoing vessel. The opposing end is extended and floats in the water, but is intended for allowing egress from the ship, as opposed to a means for escaping from the water, and does not show the cantilevered pivotal coupling of the instant invention.

Still other systems such as those disclosed in U.S. Pat. Nos. #3,755,829 and #3,540,063 are directed to turbulence suppression floats intended for use in swimming pools. The floating devices are constructed with a plurality of openings and intended to be disposed between swimming lanes of a pool, in order to quell turbulence therebetween generated by swimming. Thus, it is the intent of these devices to reduce the height of the swimmer produced swells, as opposed to reducing the displacement of the float or any member coupled thereto responsive to a transient change in a localized water level.

SUMMARY OF THE INVENTION

A swimming pool escape system for use by animals and insects is provided. The swimming pool escape system includes a base member disposed on a perimeter portion of a swimming pool. The swimming pool escape system also includes a ramp system having one end pivotedly coupled to the base member and an opposing end extending into a volume of water contained within the swimming pool and being buoyantly supported thereby for providing egress from the swimming pool by animals and insects which have inadvertently entered the water.

BRIEF DESCRIPTION OF THE DRAWINGS

FIG. 1 is a plan view of the swimming pool escape system;

DESCRIPTION OF THE PREFERRED EMBODIMENTS

Referring to FIGS. 1-4, there is shown swimming pool escape system 10 for use by animals and insects to egress a swimming pool into which they inadvertently entered. As will be seen in following paragraphs, swimming pool escape system 10 is specifically directed to the concept of saving the pool owner from the loathsome task of removing the bodies of dead insects and animals which had inadvertently entered the water, and then subsequently drowned. Such is accomplished by providing means by which the animal or insect can easily climb from the body of water 15 to the perimeter portion 22 of swimming pool 24. Swimming pool escape system 10 is not restricted to utilization with swimming pools alone, but is easily adaptable for use with any contained body of water wherein animals or insects can gain access, but would have no means by which to egress.

Animals or insects which inadvertently enter a swimming pool are unable to remove themselves in situations where the surface of the water is substantially below the perimeter ledge of the pool structure, or where the water is contained by a plastic liner. These animals and insects being unable to climb up the slippery plastic liner or the side walls, succumb therein. The bodies of the dead animals must be removed by the pool owner, who may find this task distasteful, and presents the problem of where to dispose of the bodies. To overcome this problem escape system 10 provides a means for bridging between the surface of the water and the perimeter pool structure. Thus allowing the animals and insects to remove themselves from the pool, thereby saving the pool owner from having to remove and dispose of their dead bodies.

Additionally, swimming pool escape system 10 may be releasably coupled to the perimeter portion 22 of swimming pool 24 to allow removal thereof when the pool is to be utilized by the pool owner.

Figure 1:
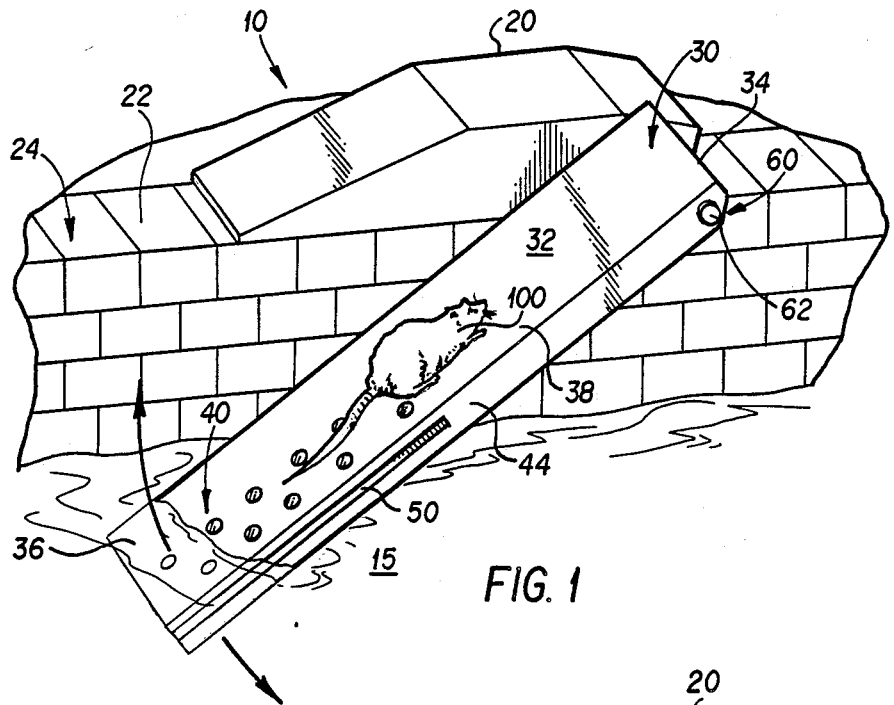
FIG. 1 is a perspective view of the swimming pool escape system.
Figure 2:
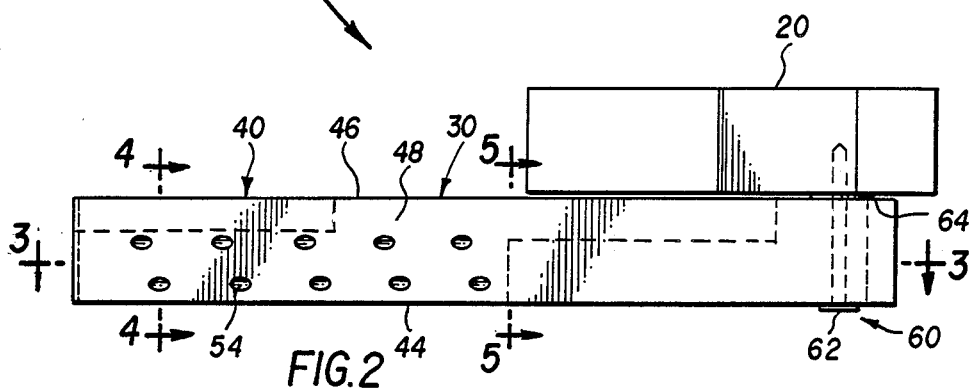
Figure 3:
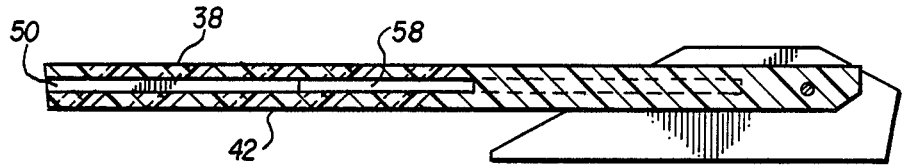
FIG. 3 is a sectional view of the swimming pool escape system taken along the section line 3—3 of FIG. 2.
Figure 5:
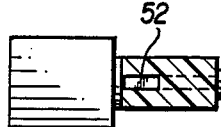
Figure 4:
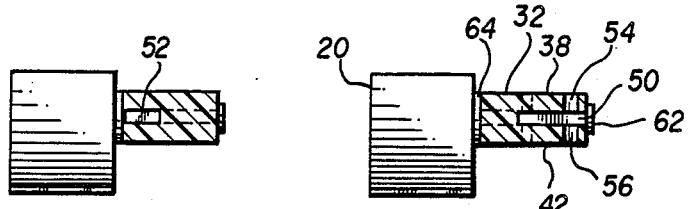
FIG. 4 is a sectional view of the swimming pool escape system taken along the section line 4—4 of FIG. 2; and, FIG. 5 is a sectional view of the swimming pool escape system taken along the section line 5—5 of FIG. 2.

As shown in FIG. 1, swimming pool escape system 10 includes a base member 20 disposed on the perimeter portion 22 of a swimming pool 24. Pivotedly coupled to base member 20 is a ramp system 30 for providing egress from the swimming pool by any animals 100 and insects which have inadvertently entered the body of water 15. The ramp system 30 is pivotedly coupled in a cantilever configuration to base member 20 at one end and is provided with an opposing end extending into the body of water 15 for buoyant support thereof. Of particular importance to the operation of swimming pool escape system 10 is the wave suppression system 40 included in ramp system 30. Wave suppression system 40 is disposed at the end of ramp system 30 supported by the body of water 15 for substantially minimizing swell induced displacement of the ramp. Thus, any swells induced by the swimming of an animal, or those induced by wind, will not cause significant displacement of the water supported end of ramp system 30, and thereby make it easier for the animal 100 to gain access to the ramp system 30.

Ramp system 30 includes a ramp member 32 formed from a material such as wood, plastic, or like materials which can be buoyantly supported by a body of water. Ramp member 32 is pivotedly coupled on a first end 34 to base member 20 by means of a pivotal coupling system 60. Ramp member 32 extends longitudinally from its first end 34 to a second end 36 disposed within the body of water 15 for buoyant support thereof. Ramp member 32 includes an upper surface 38, an opposing bottom surface 42, a first side surface 44 and an opposing second side surface 46, as shown in FIGS. 1, and 3-5.

Pivotal coupling system 60 includes a pin member 62 extending between first end 34 of ramp member 32 and base member 20, providing both a pivotal coupling and a cantilever support member. Although not important to the inventive concept, pin member 62 may be fixedly coupled to base member 20 and pivotedly coupled to ramp member 32, or alternately fixedly coupled to ramp member 32 and pivotedly coupled to base member 20, by methods well known in the art. Pivotal coupling system 20 includes a washer or spacer 64 disposed between second side surface 46 of ramp member 32 and base member 20 for preventing binding therebetween and providing sufficient spacing between base member 20 and ramp member 32 to allow free and clear movement about pivot pin 62 within the confines of the perimeter portion 22 of pool 24.

Wave suppression system 40, as shown in FIGS. 2-5, is disposed at the second end 36 of ramp member 32 for substantially minimizing swell induced displacement of the second end 36 of ramp member 32. Wave suppression system 40 includes a first slotted opening 50 formed in the first side surface 44 of ramp member 32. The first slotted opening 50 extends longitudinally from second end 36 of ramp member 32 toward first end 34. First slotted opening 50 extends from second end 36 a distance defined by the approximating range of 35–60% of the overall length of ramp member 32. In one working embodiment, first slotted opening 50 extends for a length of 12" along the first side surface of a ramp member having an overall approximate length of 26". On the opposing second side surface 46 there is provided a second slotted opening 52 formed therein. Second slotted opening 52 extends longitudinally from a positional location displaced from the second end 36 of ramp member 32. Second slotted opening 52 is displaced from second end 36 by a dimension approximating 50–80% of the length of first slotted opening 50.

First slotted opening 50 extends from the first side surface 44 transversely to a depth approximating 50–75% of the overall width of ramp member 32. Second slotted opening 52 extends from the opposing second side surface 46 to a depth having the approximating dimension of 40–60% of the overall width of ramp member 32. In one working embodiment, a ramp member having a width dimension approximating 3.25", included a first slotted through opening extending from the first side surface a depth approximating 2.25" and a second slotted opening extending from the opposing second side surface a dimension approximating 1.75'.

In a region intermediate first end 34 and second end 36 of ramp member 32 there is provided an overlap region 48 wherein there is provided a through opening 58 for providing fluid communication between first slotted opening 50 and second slotted opening 52. Through opening 58 extends longitudinally between first slotted opening 50 and second slotted opening 52 for a dimension approximating 15–35% of the length of first slotted opening 50.

Wave suppression system 40 further includes a plurality of angularly directed upper apertures 54 extending from the top surface 38 of ramp member 32 to the first slotted opening 50, to provide fluid communication therebetween. Additionally, wave suppression system 40 may further include a plurality of angularly directed lower apertures 56 extending from the bottom surface 42 of ramp member 32 to slotted opening 50, for providing fluid communication therebetween.

Upper apertures 54 are directed at an acute angle having an approximating range of 25 to 60 degrees of inclination toward first end 34 of ramp member 32. Lower apertures 56 are inclined a complementary angle with respect to upper apertures 54.

The openings 50, 52, 54 and 56 formed in second end 36 of ramp member 32 minimizing displacement of the buoyantly supported second end 36 in response to transient changes in the surface height of a localized portion of the body of water 15 within pool 24, as produced by swells resulting from wind or movement of objects within the water. Additionally, the angularly directed upper apertures 54 provide a means for water to drain from top surface 38 of ramp member 32 and thereby aid in maintaining surface 38 in a substantially dry condition.

Referring back to FIG. 1, it can be seen that pivotal coupling system 60 provides a cantilever support for first end 34 of ramp member 32. Pin member 62 is cantilevered from base member 20 for providing a simple and efficient means for pivotably supporting the ramp member 32 adjacent the perimeter portion 22 of pool 24. Base member 20 may be formed of a material having sufficient mass to counterbalance the weight of ramp member 32 and provide sufficient stabilization therefor, without the use of fasteners or other coupling devices. Thus making the system 10 easily removable from the pool structure when desired. Alternately, base member 20 may be fixedly secured to the perimeter portion 22 of pool 24 by adhesive means, or by use of fasteners, well known in the art.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A swimming pool escape system for use by small animals and insects, comprising:
    (a) a base member disposed on a perimeter portion of said swimming pool and releasably coupled thereto, said base member extending in a direction substantially parallel to said perimeter portion of said swimming pool; and
    (b) ramp means having one end pivotally coupled to said base member and an opposing end extending into a volume of water contained within said swimming pool and being buoyantly supported thereby for providing egress from said swimming pool for said animals and insects, said ramp means includes (1) wave suppression means disposed at said end of said ramp means extending into said volume of water for substantially minimizing swell induced displacement of said ramp means, and (2) means for pivotally coupling said ramp means to said base member, said pivotal coupling means defining a singular cantilever support for said ramp means, said ramp means extending in a direction substantially parallel to said base member.

2. The swimming pool escape system as recited in claim 1 where said base member is formed of a predetermined material composition having sufficient mass to counter balance said ramp means.

3. The swimming pool escape system as recited in claim 1 where said ramp means is defined by a longitudinally extended ramp member having a first end pivotally coupled to said base member and a second end buoyantly supported by said water, said ramp member having (1) an opposing top and bottom surface, and (2) a first side surface and an opposing second side surface.

4. The swimming pool escape system as recited in claim 3 where said ramp member is formed of a plastic material composition.

5. The swimming pool escape system as recited in claim 3 where said ramp member is formed of a wooden material composition.

6. The swimming pool escape system as recited in claim 3 where said wave suppression means includes a first slotted opening formed in said first side surface of said ramp member, said first slotted opening extending longitudinally from said second end of said ramp member.

7. The swimming pool escape system as recited in claim 6 where said wave suppression means further includes a second slotted opening formed in said second side surface of said ramp member, said second slotted opening extending longitudinally from a positional location displaced from said second end of said ramp member.

8. The swimming pool escape system as recited in claim 6 where said top surface of said ramp member includes a plurality of upper apertures formed therein, each of said plurality of upper apertures defining a passage extending between said top surface and said first slotted opening.

9. The swimming pool escape system as recited in claim 6 where said bottom surface of said ramp member includes a plurality of lower apertures formed therein, each of said plurality of lower apertures defining a passage extending between said bottom surface and said first slotted opening.

10. The swimming pool escape system as recited in claim 7 wherein a through opening is formed between a portion of said first slotted opening and a portion of said second slotted opening for providing fluid communication therebetween.

11. The swimming pool escape system as recited in claim 8 where each of said upper apertures are angularly directed from said top surface of said ramp member to said first slotted opening.

12. The swimming pool escape system as recited in claim 9 where each of said lower apertures are angularly directed from said bottom surface of said ramp member to said first slotted opening.

13. The swimming pool escape system as recited in claim 3 where said pivotal coupling means includes a pin member.

14. The swimming pool escape system as recited in claim 13 where said pin member is fixedly coupled to said base member and pivotally coupled to said ramp member.

15. The swimming pool escape system as recited in claim 13 where said pin member is fixedly coupled to said ramp member and pivotally coupled to said base member.

* * * * *